United States Patent [19]
Powell

[11] Patent Number: 4,782,722
[45] Date of Patent: Nov. 8, 1988

[54] BICYCLE DRIVE SYSTEM

[76] Inventor: George Powell, 5805 Fifth Ave., NE., Seattle, Wash. 98105

[21] Appl. No.: 886,202

[22] Filed: Jul. 15, 1986

[51] Int. Cl.[4] .............................................. F16H 3/44
[52] U.S. Cl. ..................................... 74/750 B; 74/785
[58] Field of Search ............. 74/750 B, 750 R, 752 B, 74/781 B, 785; 192/6 A, 6 B, 6 R

[56] References Cited

U.S. PATENT DOCUMENTS

| | | | |
|---|---|---|---|
| 882,845 | 3/1908 | Sachs | 74/781 B |
| 2,228,006 | 1/1941 | Glacy | 74/781 B |
| 2,301,852 | 11/1942 | Brown | 74/781 B |
| 3,842,691 | 10/1974 | Shea | 74/750 B X |
| 3,870,134 | 3/1975 | Anthamatten | 192/6 A |
| 3,934,493 | 1/1976 | Hillyer | 74/750 B |
| 4,052,914 | 10/1977 | Nakajima | 74/750 B |
| 4,179,953 | 12/1979 | Hanada et al. | 74/750 B |
| 4,286,480 | 9/1981 | Dickie | 74/785 |
| 4,305,312 | 12/1981 | Lapeyre | 74/750 B |
| 4,323,146 | 4/1982 | Fukui | 74/750 B X |
| 4,583,427 | 4/1986 | Blattmann | 74/750 B X |

Primary Examiner—Leslie A. Braun
Assistant Examiner—David Novais
Attorney, Agent, or Firm—Russell W. Illich

[57] ABSTRACT

A drive system for use upon a bicycle including a two speed rear axle 18 including an interior coaster brake 62, 64 driven by a multispeed transmission 12 including a plurality of selective planetary reductions. The drive system incorporates a multiple gear mechanism at the pedal hub combined with a two-speed mechanism at the driving wheel hub.

7 Claims, 6 Drawing Sheets

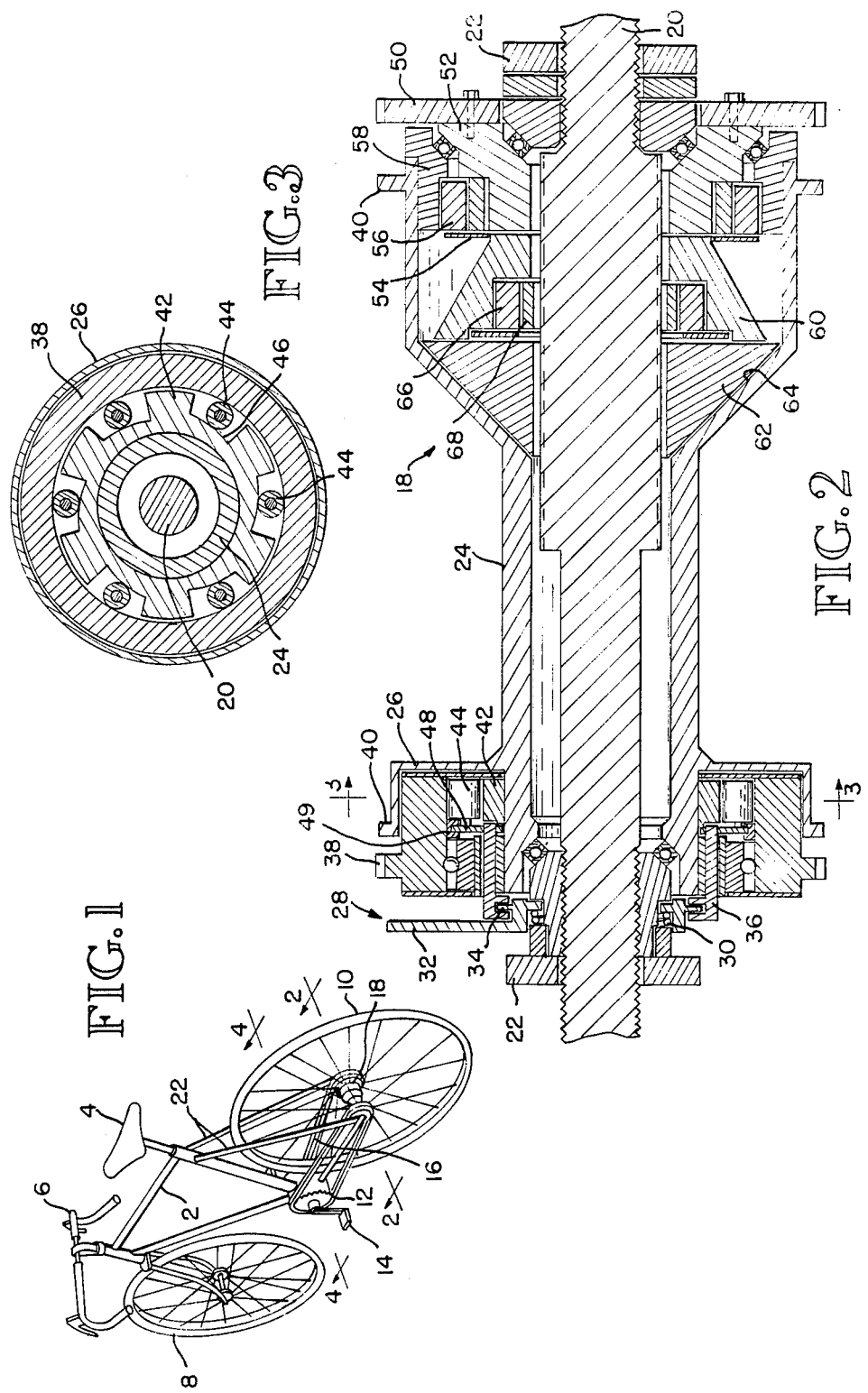

BICYCLE DRIVE SYSTEM

DESCRIPTION

1. Technical Field

This invention relates to bicycle transmission means and more particularly to a multiple speed transmission device incorporating a two-speed drive mechanism at the driving wheel hub and a multiplying transmission at the pedal shaft. The device incorporates one-way clutch mechanisms and planetary gear combinations to achieve the desired result.

2. Background Art

Bicycling has long been a vehicle popular for sport as well as a device utilized in many countries as basic transportation and in commerce. There are many bicycles which are specially manufactured for a particular purpose such as racing, off-road riding and the like. These specialized bicycles tend to be manufactured to critical specifications and thus are both expensive and inappropriate for general usage.

There is, in addition to the market for specialized bicycles, a demand for a simple rather straightforward bicycle which provides an economical means of transportation. It is this bicycle that must be low in price, sturdy and durable, requiring little maintenance. The normally accepted method of providing multiple gear ratios in the commonly used bicycle includes the internal three-speed gear mechanism in the drive hub or the external multiple sprocket derailleur means.

3. Prior Art

Prior art known to the present inventor include U.S. Pat. No. 3,842,691 granted to Shea on Oct. 2, 1974 which discloses a planetary transmission at the bicycle pedal crank hub wherein the transmission shifting mechanism includes a plurality of palls selectively engageable with a ring gear to maintain the selected ring gear stationary and thus control the gear reduction.

U.S. Pat. No. 3,870,134 granted to Anthamatten on Mar. 11, 1975 discloses a multiple speed bicycle drive and coaster brake arrangement wherein the multiple speed drive is a derailleur type arrangement and the coaster brake is actuated by a separate sprocket and chain.

U.S. Pat. No. 4,305,312 granted to LaPeyre, Dec. 15, 1981 discloses a multiple speed bicycle transmission located at the drive pedal hub where the gear shift changes are affected by a limited reverse rotation of the pedal drive.

DISCLOSURE OF THE INVENTION

With the above noted prior art and problems in mind, it is an object of the present invention to provide a transmission system which allows substantial flexibility in terms of being able to provide a select one of a number of gear change mechanisms for use on a bicycle each utilizing the same general concept and having interchangeable parts to economize upon the manufacture cost.

It is another object of the present invention to provide a gear change mechanism which combines a multiple gear mechanism at the pedal hub combined with a two speed mechanism at the driving wheel hub, thus effectively multiplying the available possibilities.

Still a further object of the present invention is to provide a multiple gear transmission device for use on bicycles or the like wherein the gear change mechanism is simple, easy to operate and durable.

Yet another object of the present invention is to provide a multi-speed bicycle in conjunction with a coaster brake.

BRIEF DESCRIPTION OF THE DRAWINGS

FIG. 1 is an isometric view of the bicycle utilizing inventive gear change mechanism.

FIG. 2 is a sectional view along lines 2—2 through the drive wheel hub of FIG. 1 showing the gear change and coaster brake mechanism.

FIG. 3 is a sectional view along lines 3—3 of FIG. 2.

BEST MODE FOR CARRYING OUT THE INVENTION

Figure 4:
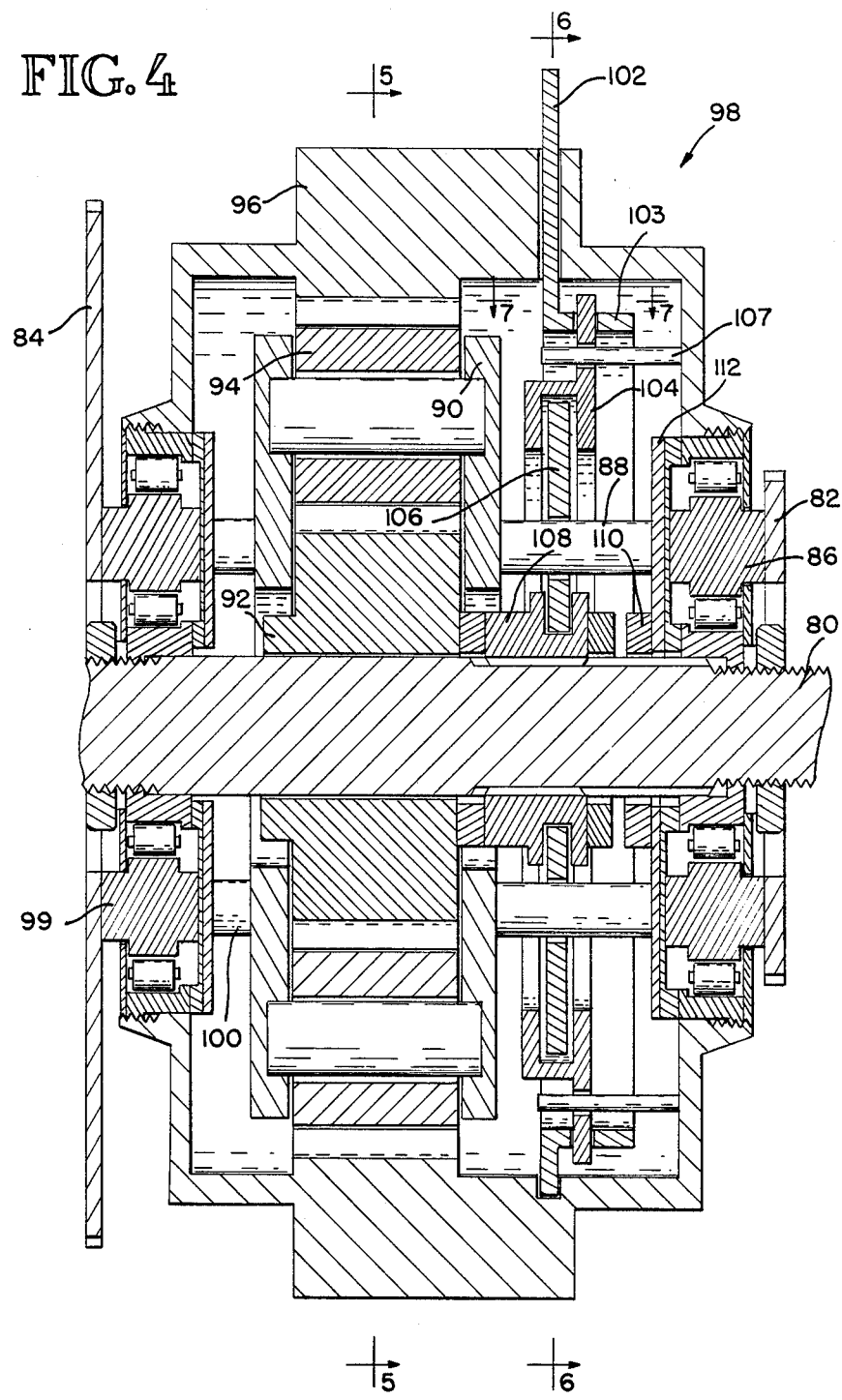
FIG. 4 is a sectional view along lines 4—4 of FIG. 1 showing one transmission configuration.

Referring now to the drawings, it can be seen that the present invention is applied to a conventional bicycle having a frame 2, seat 4, handle bar 6, front wheel 8 and driving wheel 10. The transmission 12 is driven by conventional pedals 14. A pair of driving chains 16, through appropriate sprocket wheels, propel the driving hub 18. It is to be noted that in the preferred embodiment the left sprocket wheel at the pedal hub is larger than the right sprocket wheel, to produce a differential speed at the driving wheel hub.

Referring now to FIG. 2, the fixed shaft 20 upon which the drive hub, generally designated as 18 is mounted, can be seen. The lower portion of the rear forks 22 are shown for clarity and to assist the reader in visualizing the unit. The forks are held in place by nuts (not shown).

Referring now to the left end portion of FIG. 2, it can be seen that hub housing 24 has a radially outwardly extending or flared portion 26 which partially encapsulates clutch means as explained in greater detail hereinafter and further extends linearly as an extension of hub 24 to provide a stable base for both the clutch member and the shifting device. The extension of hub 24 and flared portion 26 form an annular cup housing the speed change mechanism.

Shift lever 28 is remotely actuated and is moved in a direction into or out of the paper as shown in this figure and is continuously urged to the right by spring means 30. The shift lever includes the lever arm 32 which extends through a shift guide slot 34 which is in the form of an inclined plane, again, extending into the paper as shown in this view. Because of the inclined plane 34, as the lever arm 32 is moved forwardly or backwardly the pins 36 move coaxial to the axes of shaft 20 moving into and out of engaging position with the one-way clutch mechanism, described hereinafter, driving the bicycle in a forward direction which engages since then sprocket member 38 would drive hub housing 24 and the spoke member secured thereto.

The clutch mechanism of the drive wheel hub is depicted in FIG. 3, which is a sectional view along lines 3—3 of FIG. 2. The clutch mechanism includes an interior containment member 42 capturing a plurality of roller members 44 in a space between an inclined inner surface 46 and the interior of sprocket wheel 38 such that when member 42 moves relative to sprocket 38 two conditions will occur. If roller member 44 is wedged between the bottom surface 46 and the inner surface of sprocket 38 then the two units will rotate together, however, if the relative placement is such that rollers 44 can turn freely then there will be a free wheeling condition and sprocket 38 can turn freely relative to member 42.

When shift lever 28 is moved to the position where pins 36 engage member 48, rollers 44 and member 48 will be in a constant position with respect to hub 24 and member 42. In this configuration, the clutch is in a free wheeling condition i.e. sprocket 38 cannot drive hub 24 forward, 24 can rotate forward with respect to sprocket 38 regardless of pins the position of 36. To facilitate the engagement of pins 36 with member 48, sprocket 38 must be held stationary while hub 24 and member 42 are rotated forwardly. The bicycle will be moving in a forward direction at this time. In operation, friction device 49 will cause member 48 to pins rotate into a position with respect to 36 such that pins 36 can move into the elongated hole in member 48 (to the right). When pins 36 are moved left, disengaged from member 48, forward motion of sprocket 38 acting through friction device 49 will rotate member 48 and rollers 44 forward with respect to member 42 and rollers 44 will engage both member 42 and sprocket 38. Sprocket 38 will now drive hub 24 forward but hub 24 can rotate forward when sprocket 38 is stationary.

Referring now to the right hand side of FIG. 2, a sprocket wheel 50 is bolted to the flange member 52 which, via a one-way clutch, comprising elements 54, 56, 58, drives the hub housing 24 and thus the wheel. The reason for a one-way clutch at this location is so that free wheeling is possible while still allowing the sprocket 38 to drive the wheel. Thus, as can be seen, when the left hand clutch mechanism is engaged, there is a direct drive from sprocket wheel 38, the one having the higher speed in the preferred embodiment, and when the left hand clutch mechanism is not engaged it is in the free wheel status and there is a direct drive through the sprocket 50. It can be seen that two speeds at the rear axle are provided without the necessity of a complex gear change mechanism.

Braking is provided by an inclined plane stair step type ratchet on the left hand face of element 52 which causes brake actuating element 60 to move axially on fixed axle 20 moving the actual braking element 62 to engage the braking surface 64 on the interior of the hub housing 24. A one-way clutch similar to that shown in FIG. 3, comprising elements 60, roller members 66 and containment elements 68 allows the elements to free wheel during forward pedaling and causes engagement of the brake mechanism on a rigorous reverse pedal movement.

FIGS. 4–12 deal with the multi-speed transmission of the present invention which is mounted to the frame adjacent the pedals which are secured to drive shaft 80 having sprockets 82, 84. It is to be noted that sprocket 82 is of a smaller diameter than sprocket 84 delivering different speeds to the drive axle. Sprocket 82 is rigidly connected to transfer ring 86 which in turn is rigidly connected to a plurality of posts 88 which transfer the rotary motion to the cage 90 of a planetary gear system having a sun 92, planets 94 and an annulus 96 machined to the interior surface of encasement member generally designated 98. Sprocket 84 which is a different size than sprocket 82 has a connecting ring 99 and short connecting posts 100 interconnecting it with cage 90.

The two speed drive as generated at the drive wheel hub is multiplied, however, by the utilization of the planetary gear system in the transmission. The transmission is engaged by moving shift lever 102. Shift lever 102 includes a right angle flange 103 having an angled slot therein. Shift ring 104 mounted upon a plurality of pins 107 and having projections extending into the angled slot is caused to move axially. Thus the shift is operational through shifting ring 104 and transfer ring 106 which cause ring 108 to move axially of axle 80. Ring 108 includes a plurality of teeth at each end. When ring 108 is in the position shown in FIG. 4 the teeth are engaged with the sun 92 and the drive is modified by passing through the planetary system. When the ring 108 is moved to the right, the teeth at the opposite end engage gear 110 mounted to connecting plate 112 and there is a direct drive from the pedal shaft 80 to the sprockets. It is to be understood that the sprockets must always turn at the same rate but the rate will depend upon whether or not the drive is through the planetary.

It is further to be understood that shown but not described are lubrication seals and transmission covers as necessary.

Figure 5:
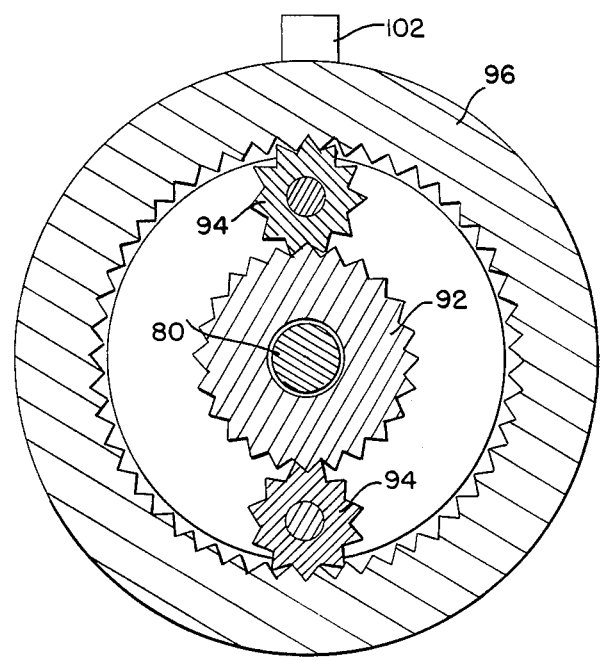
FIG. 5 is a sectional view along lines 5—5 of FIG. 4.

Referring now to FIG. 5, the internal relationship of the planetary transmission including the annulus 96 planetary gears 94 and sun gear 92 which spins freely about drive shaft 80 may best be seen.

Figure 6:
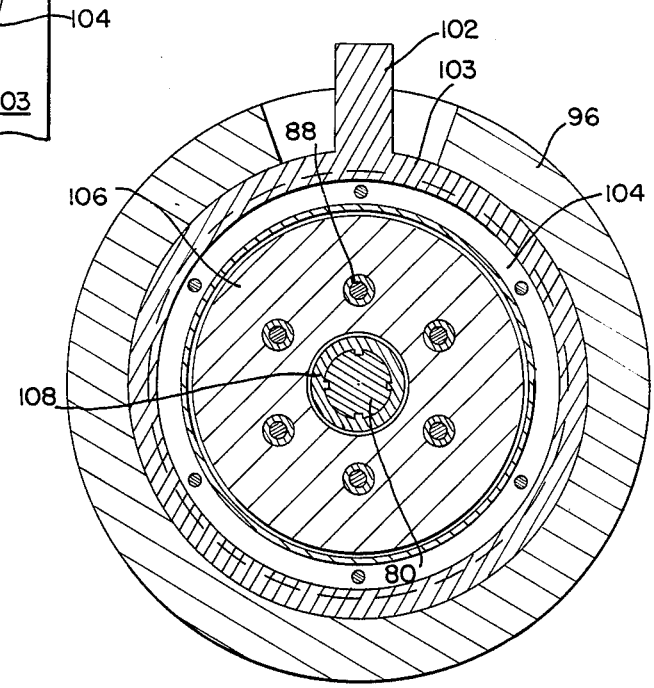
FIG. 6 is a sectional view along lines 6—6 of FIG. 4.

FIG. 6 shows the interrelationship between the shift lever 102 which is relatively fixed, except for the shifting movement, annular shift control 104, shift plate 106, spur 108 and drive shaft 80.

Figure 7:
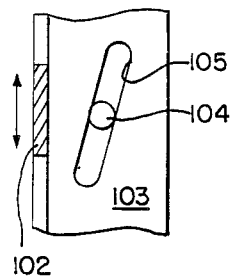
FIG. 7 is a partial sectional view along lines 7—7 of FIG. 4.

FIG. 7 depicts the structure including shift lever 102 and slot 105 in ring 103 and through which projections from ring 104 extend and which generates the axial shifting movement.

Figure 8:
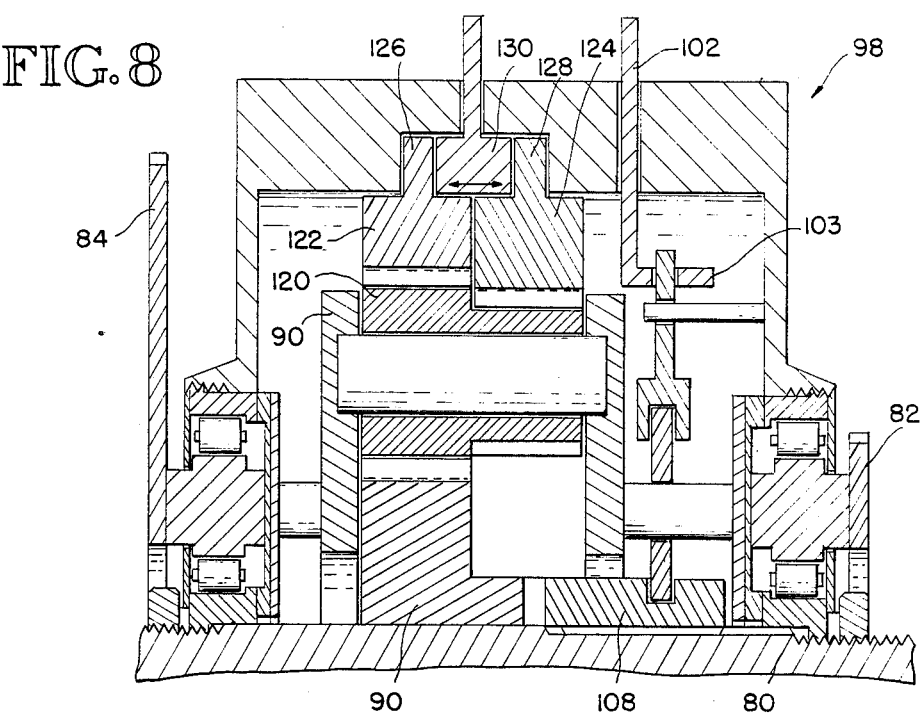
FIG. 8 is a view showing an alternate transmission configuration.

Referring now to FIG. 8, identical parts to FIG. 4 will not be described in detail, however, it should be noted that planetary gear 120 has a stairstep design and thus a multiplication factor of two differing ratios. The annulus in this embodiment includes a pair of ring gears 122, 124 including outwardly extending rib flanges 126, 128 to interact with shift lock mechanism 130 which, by means previously described, is movable axially of the drive shaft 80 to alternatively lock annular gear 122 or 124 thus producing a three speed transmission. The lever 102 has previously been described in detail. Identical numbers are utilized in this figure for identical parts to those of FIG. 4, however, it should be noted, that element 108 is elongated to accommodate the additional mechanism.

Figure 9:
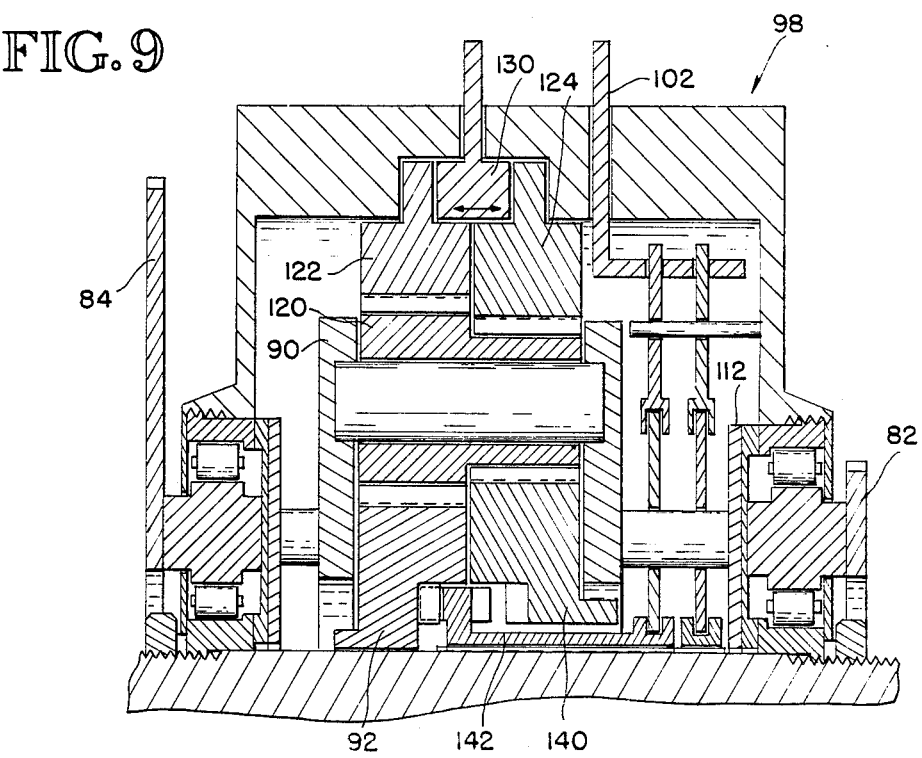
FIG. 9 is a view showing another alternate transmission configuration.

Referring now to FIG. 9, a five speed transmission is provided by the addition of a second sun gear 140 to interact with the second step of planetary gear 120. Shift lever 102 has been modified to provide two shift mechanism to control shift cylinder 142 which will alternatively engage sun gear 92 or sun gear 140 and still has a third position wherein neither sun gear is engaged but the direct drive via plate 112 is accomplished.

Figure 10:
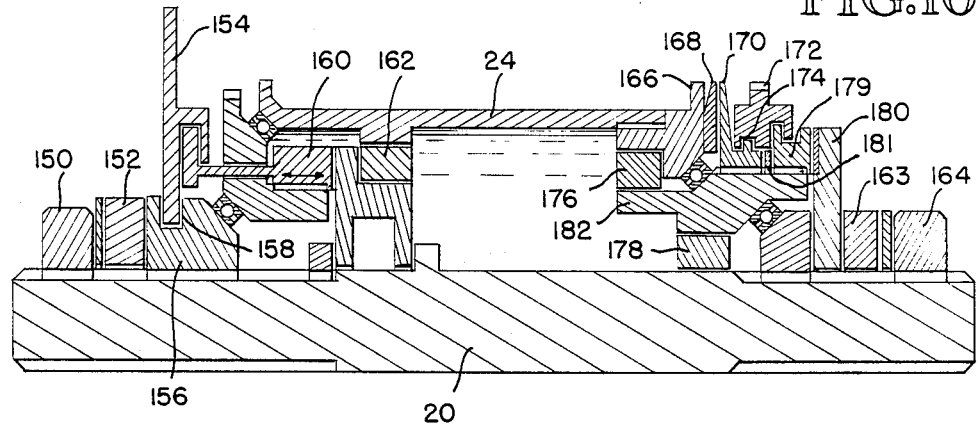
FIG. 10 is an alternate drive wheel hub and coaster brake configuration.
Figure 11:
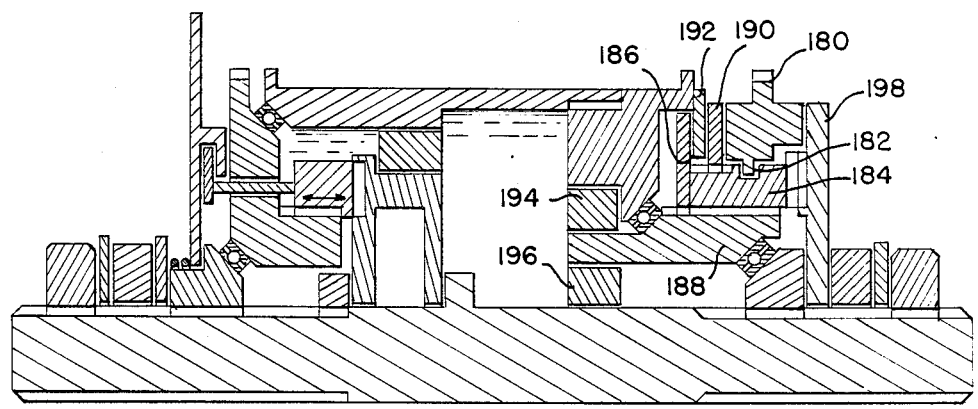
FIG. 11 is yet another drive wheel hub, coaster brake configuration.
Figure 12:
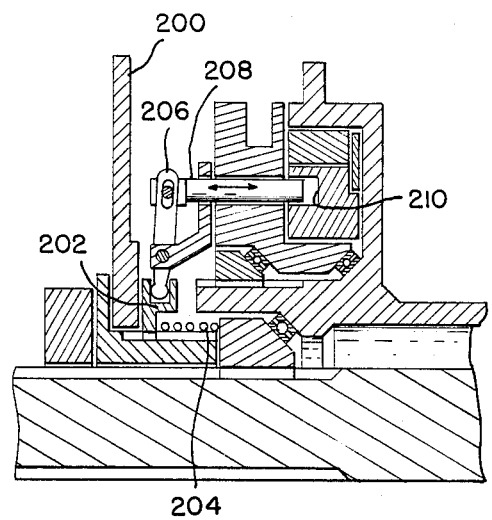
FIG. 12 is an alternate shifting mechanism for the drive wheel hub.

FIGS. 10, 11 and 12 are modifications of the drive hub and for simplicity only those portions which are changed from the mechanism of FIG. 2 will be described in detail. The left hand portion of FIGS. 10 and 11 is identical and adjacent the axle 20 it can be seen that the left hand extreme comprises nut 150, the fork 152, shift lever 154, having its foot fixedly lodged in nut 156. The groove 158 containing the foot of lever 154 is at an angle such that movement of the shift lever will cause axial movement of the shift dog 160 which will selectively engage the clutch 162, effectively driving the hub 24.

The right portion of FIG. 10 includes fork 163 held in place by nut 164. The spoke flange 166 has adjacent thereto a brake pad 168 for rotation with the hub 24. A second brake pad 170 is secured to the sprocket wheel 172 which is mounted to engage outwardly extending thread 174, which has a left hand incline such that when the sprocket wheel is moved counterclockwise, pad 170 will move axially left and sprocket 172 and member 179 will move axially right. When member 179 contacts member 180, pad 170 will be pressed against pad 168 and the brake will be set pad, 170 and member 179 are splined to member 182. Ring 181 is mounted solidly on member 182 to assure that member 179 pulls away from member 180 when the bicycle is being pedaled forward. Proper operation of the brake requires that member 179 does not rotate in respect to member 180 when the brake is set. Clutches 176, 178 are both one-way and thus allow the braking and free wheeling functions.

Referring now to FIG. 11, it can be seen that the left hand portion is identical to that as shown with respect to FIG. 10. Whereas the right hand portion has an identical concept, the configuration is changed slightly and sprocket wheel 180 is mounted with an inwardly projecting thread 182 engaged in a left hand congruent thread in actuator member 184. Elements 186 and 190, splined to members 188 and 184, respectively, are the brake pads which act against brake drum 192. Member 184 is splined to member 188. Counterclockwise motion of sprocket wheel 180 causes leftward movement of sprocket 180 and rightward movement of member 184 thus engaging the teeth on the right side of member 184 with the teeth on the left side of member 198. Additional counterclockwise rotation of 180 will engage the drum 192 from both sides thus setting the brake. One-way clutch members 194, 196 operate similar to that described with respect to FIG. 2 allowing free wheeling and selective braking.

Reference is now made to FIG. 12 wherein an alternate shift mechanism is proposed for the hub and in this device shift lever 200 causes movement of yoke member 202 which is urged to the left of the drawing by spring 204. Axial movement of yoke 202 causes similar axial movement to lever arm 206 and pin 208 which is selectively moved into bore 210 to engage the clutch and drive the wheel.

Thus as can be seen the present invention discloses a multi-gear bicycle which can be fabricated in any one of several configurations changing the gear ratio and the gearing itself can be adjusted by changing the size of the gears.

I claim:

1. A bicycle transmission comprising:
   a splined driving shaft,
   first sprocket means selectively engaged through a first drive train with the shaft to provide a direct drive link,
   a planetary gear set surrounding said driving shaft including a sun gear means selectively engaged with the splined shaft, at least one planet gear for rotating around said sun gear means, and a rigid annulus means in which the planet gear rotates within,
   second sprocket means driven by the planetary gear set forming a second drive train,
   a shiftable spur means to selectively engage the splined shaft with either the first or second drive train:
   wherein, the second drive train becomes active only when the planet gear rotates within the rigid annulus means
   wherein said at least one planet gear is mounted on a cage and the cage is connected to a first sprocket wheel, the first sprocket wheel forming said first sprocket means through said first drive train by a direct drive link with the driving shaft and the spur means, the first sprocket wheel forming said second sprocket means through said second drive train by the planetary gear set and said cage
   wherein the cage is further connected to a second sprocket wheel, the second sprocket wheel providing a third sprocket means through a third drive train with the driving shaft to provide a direct drive link, the second sprocket wheel further providing a fourth sprocket means forming a fourth drive train through the planetary gear set.

2. A bicycle transmission as in claim 1, wherein said rigid annulus means is an integral part of an encasing member for enclosing the planetary gear set and on which the first and second sprocket means is mounted.

3. A bicycle transmission comprising:
   a splined driving shaft,
   first sprocket means selectively engaged through a first drive train with the shaft to provide a direct drive link,
   a planetary gear set surrounding said driving shaft including a sun gear means selectively engaged with the splined shaft, at least one planet gear for rotating around said sun gear means, and a rigid annulus means in which the planet gear rotates within,
   second sprocket means driven by the planetary gear set forming a second drive train,
   a shiftable spur means to selectively engage the splined shaft with either the first or second drive train:
   wherein, the second drive train becomes active only when the planet gear rotates within the rigid annulus means,
   wherein said rigid annulus means comprises:
   a first ring gear held rigid by a lock means and within which a first step of the planet gear rotates to form the second drive train,
   a second ring gear held rigid by said lock means and within which a second step of the planet gear rotates to form a third drive train,
   said lock means including a shiftable member for selectively engaging and holding rigid the first or second ring gear.

4. A bicycle transmission as in claim 3, wherein said sun gear means comprises a first sun gear engaged with the first step of the planet gear and a second sun gear engaged with the second step of the planet gear,
   said spur means further comprising a shift cylinder selectively engageable between three positions, a first position forming the first drive train through a direct drive link, a second position wherein the shift cylinder connects the driving shaft with the first sun gear to form the second and third drive trains through the two-step planet gear, and a third position wherein the shift cylinder connects the driving shaft with the second sun gear to form fourth and fifth drive trains through the two-step planet gear.

5. A bicycle drive system comprising:

a first transmission means including a first sprocket wheel secured adjacent a first pedal crank, a second sprocket wheel secured adjacent a second pedal crank, and a pedal shaft rigidly connecting the first and second pedal cranks, a drive wheel hub rotatable about a stationary shaft, third and fourth sprocket wheels rotatably mounted on the stationary shaft on opposite ends of the hub, linking means interconnecting the first sprocket wheel with the third sprocket wheel and the second sprocket wheel with the fourth sprocket wheel, respectively, clutch means for enabling the third sprocket wheel to drive the hub or alternatively enabling the fourth sprocket wheel to drive the hub thereby forming two different gear ratios.

6. The bicycle drive system of claim 5, further comprising brake means splined to the stationary shaft and selectively movable into contact with the hub.

7. The bicycle drive system of claim 5, wherein the first and second sprocket wheels are connected to a planetary gear box and selectively engaged with the planetary gear box or alternatively directly driven by the pedal shaft, thereby forming at least two more additional gear ratios.

* * * * *